(12) United States Patent
Yializis

(10) Patent No.: US 9,711,286 B2
(45) Date of Patent: Jul. 18, 2017

(54) POLYMERIC MONOLITHIC CAPACITOR

(71) Applicant: SIGMA LABORATORIES OF ARIZONA, LLC, Tucson, AZ (US)

(72) Inventor: Angelo Yializis, Tucson, AZ (US)

(73) Assignee: SIGMA LABORATORIES OF ARIZONA, LLC, Tucson, AZ (US)

( * ) Notice: Subject to any disclaimer, the term of this patent is extended or adjusted under 35 U.S.C. 154(b) by 240 days.

(21) Appl. No.: 14/668,787

(22) Filed: Mar. 25, 2015

(65) Prior Publication Data
US 2016/0284472 A1   Sep. 29, 2016

(51) Int. Cl.
| H01G 4/06 | (2006.01) |
| H01G 4/30 | (2006.01) |
| H01G 4/12 | (2006.01) |
| H01G 4/33 | (2006.01) |

(52) U.S. Cl.
CPC ............. *H01G 4/129* (2013.01); *H01G 4/304* (2013.01)

(58) Field of Classification Search
CPC .......... H01G 4/304; H01G 4/129; H01G 4/30; H01G 4/12; H01G 4/33
USPC .................................. 361/301.4, 321.1, 311
See application file for complete search history.

(56) References Cited

U.S. PATENT DOCUMENTS

| 4,954,371 A | 9/1990 | Yializis |
| 5,018,048 A | 5/1991 | Shaw et al. |
| 5,097,800 A | 3/1992 | Shaw et al. |
| 5,716,532 A | 2/1998 | Yializis et al. |
| 5,731,948 A | 3/1998 | Yializis et al. |
| 6,092,269 A | 7/2000 | Yializis |
| 6,165,832 A | 12/2000 | Honda et al. |
| 2009/0308532 A1* | 12/2009 | Kinoshita ............ H01G 4/008 156/281 |
| 2013/0329334 A1* | 12/2013 | Hiramatsu ............ H01G 4/12 361/272 |

FOREIGN PATENT DOCUMENTS

JP    2003303735 A  * 10/2003

* cited by examiner

*Primary Examiner* — Eric Thomas
*Assistant Examiner* — Arun Ramaswamy
(74) *Attorney, Agent, or Firm* — Yakov Sidorin; Quarles & Brady LLP

(57) ABSTRACT

Prismatic polymer monolithic capacitor structure operating at temperatures exceeding 140° C. and including multiple interleaving radiation-cured polymer dielectric layers and metal layers. Method for fabrication of same. The geometry of structure is judiciously chosen to increase sheet resistance of metal electrodes while reducing the capacitor's equivalent series resistance. Metal electrode layers are provided with a thickened peripheral portion to increase strength of terminating connections and are passivated to increase corrosion resistance. Materials for polymer dielectric layers are devised to ensure that the capacitor's dissipation factor remains substantially unchanged across the whole range of operating temperatures, to procure glass transition temperature that is no less than the desired operating temperature, and to optimize the absorption of ambient moisture by the polymeric layers.

42 Claims, 7 Drawing Sheets

POLYMERIC MONOLITHIC CAPACITOR

TECHNICAL FIELD

The present invention relates generally to polymer monolithic capacitors and, in particular, to capacitors configured to have polymer dielectric formulation that maximizes the capacitor self-healing properties allow operation at temperatures exceeding at 125° C. and possess dissipation factor that does not substantially increase as the operating temperature increases.

BACKGROUND

Metallized film capacitors are used extensively in a broad range of electrical and electronic equipment that include motor run and motor start circuits for air conditioners, fluorescent and high intensity light ballasts, power supplies, telecommunication equipment, instrumentation, and medical electronics. In many of these applications, the metallized film capacitors (MFCs) are used to conserve energy by correcting the power factor of a circuit and in other applications they are used to perform specific functions, such as timing, filtering, and decoupling applications.

In order to reduce the dimensions of an MFC—an ever popular task—a thickness of a polymer film constituent of such capacitor should be reduced. The reduction of the thickness of the polymer film (such as, for example, a polypropylene film) is limited by the film-manufacturing process to a few microns. The related art (such as U.S. Pat. Nos. 6,165,832; 6,092,269; 5,731,948; 5,716,532; 5,097,800; 5,018,048 and 4,954,371) proposed some solutions to overcome this limitation by devising a new technological approach in which ultrathin vacuum-deposited polymer dielectrics are interleaved with vacuum-deposited metal electrode layers to form polymer monolithic capacitors with thousands of dielectric and electrode layers. During the fabrication, the dielectric materials are cross-linked with the use of electron beam or UV radiation. These capacitors are characterized by much higher energy density than conventional, polymer film capacitors.

Power electronics switching circuits (including inverter modules used in hybrid and electric vehicles, for example) utilize metallized film capacitors in the DC-link part of the circuit to minimize ripple current, voltage fluctuations, and to suppress transients. Key characteristics of DC-link capacitors used in voltage-sourced inverters of electric drive vehicles include self-healing properties to assure a benign failure mode, high ripple current capacity, low dissipation factor (DF), and high operating temperature. Metallized polypropylene film capacitors that service most DC-link applications are rated at 85° C. and can be used up to 105° C. with significant derating in voltage, ripple current and capacitor life. There remains a need in the industry to not only broaden the range of operating temperature of the MFCs and to extend the capacitor's upper operating temperature to at least 125° C. and preferably as high as 140° C., (while maintaining stable or substantially unchanged various operational characteristics such as, for example, capacitance and dissipation factor), but also to find ways to further reduce the capacitor's size and cost while maintaining a benign failure mode.

SUMMARY

Embodiments of the invention provide a polymer monolithic capacitor formed in the vacuum. Such capacitor includes multiple polymer dielectric layers, and multiple metallized electrode layers. At least one polymer dielectric layer comprises a chemical structure with a hydrogen-to-carbon ratio of at least 1.0 and an oxygen-to-carbon ratio of at least 0.1, and at least one polymer dielectric layer has a glass transition temperature greater than 100° C.

Related embodiments provide a polymer monolithic capacitor formed in the vacuum and containing multiple polymer dielectric layers, and multiple metal electrode layers, in which capacitor at least one polymer dielectric layer includes a chemical structure with a hydrogen-to-carbon ratio of at least 1.0 and an oxygen-to-carbon ratio of at least 0.1, and where at least one metal electrode layer has a surface layer that is passivated.

In a related embodiment, a polymer monolithic capacitor, that is formed in the vacuum and that includes multiple polymer dielectric layers and multiple metallized electrode layers, a polymer dielectric layer contains a chemical structure with a hydrogen-to-carbon ratio of at least 1.0 and an oxygen-to-carbon ratio of at least 0.1, and the capacitor has a dissipation factor smaller than 0.02 at a temperature greater than 100° C.

In a specific implementation, such multiple polymer dielectric layers and multiple metallized electrode layers can be interleaved with one another.

BRIEF DESCRIPTION OF THE DRAWINGS

The disclosure presented in the Detailed Description section of the present application will be better understood in conjunction with the following generally not-to-scale Drawings, of which.

DETAILED DESCRIPTION

Figure 1A:
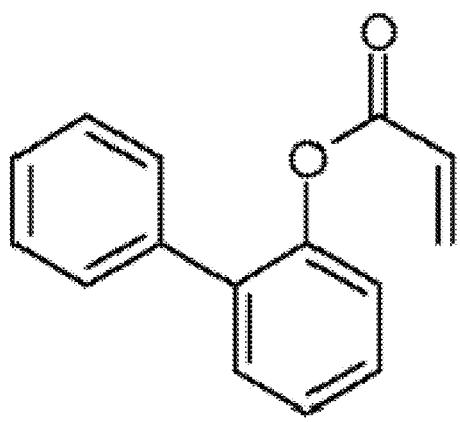
FIGS. 1A and 1B provide schematic diagrams of two monomer chains.

This invention is directed at fabrication of polymer monolithic capacitors possessing self-healing properties that prevent catastrophic failure of a capacitor and result only in a benign failure mode, high temperature stability, resistance to degradation in high-temperature and high-humidity environments, and ability to handle high ripple currents, which present a unique set of properties demanded from the polymer monolithic capacitors by, for example, the automotive inverter applications.

The term "polymer monolithic capacitor" (PMC) is used to describe a capacitor that originates as a multilayer composite or a "mother capacitor" material produced around a rotating process drum with thousands of polymer dielectric and electrode layers. The mother capacitor material is removed from the drum and is processed into individual capacitors, via a series of process steps that include pressing the mother capacitor material, segmentation into individual capacitors, etching of the electrodes at the cut edges to prevent flashover and termination steps that include plasma ashing of the polymer at the termination edge to reveal the aluminum electrodes and arc spraying a metal over the exposed aluminum electrodes to connect the thousands of electrode layers and form a capacitor with two sets of electrodes.

The terms "polymer dielectric" and "polymer dielectric layers" may be used interchangeably to describe a layer of polymer, which is produced by flash evaporation of a radiation-curable monomer material that is vaporized and condensed on a rotating drum, and then cured with electron beam or UV radiation.

The terms "cure", "polymerization" and "cross-linking" may be used interchangeably to refer to the process by which a condensed monomer material is converted into a polymer dielectric material.

The terms "metal electrodes" and "aluminum electrodes" may be used interchangeably to define the polymer monolithic capacitor electrodes, of which aluminum electrodes are but one example.

The term "electrode passivation" means that the metal electrodes (and, in particular, aluminum metal electrodes) are exposed to an oxygen-containing plasma immediately after their deposition to form an oxide layer thereon such an $Al_2O_3$ oxide layer, which is the most stable and corrosion resistant aluminum oxide. If not passivated in this manner then, when the multilayer capacitor is exposed to humidity, a hydrated aluminum oxide is formed ($Al_2O_3.(H_2O)$), which is not as protective as $Al_2O_3$, thereby leading to rapid electrode corrosion.

The terms "heavy edge" and "heavy electrode edge" are used to describe a section of the capacitor electrode, located outside the active capacitor area, that is made thicker than an active electrode of the capacitor to facilitate a lower resistance contact with a coating (such as an arc spray coating, for example) that connects the individual electrode layers together.

The terms "self-healing", "self-healing event" and "clearing" may be used interchangeably, in reference to MFCs, to denote a process occurring during a breakdown of the capacitor's dielectric, as a result of which the electrical short between the two electrodes causes a current flow that melts the thin metal electrodes around the location of the short (like a fuse), thereby isolating the location of the fault, protecting the capacitor component from being destroyed by the dielectric breakdown, and allowing the capacitor to operate with virtually an insignificant amount of capacitance loss.

The terms "plasma ashing" and "plasma etch" refer to a process where a polymer material in the presence of an oxidative plasma is "ashed" or burned away as a result of conversion of the polymer material into low molecular weight gaseous products. This process is used to remove polymer at the edges of the monolithic capacitors to expose the metal electrodes so that the electrodes can be shorted together with an appropriate coating to form a capacitor termination.

The terms "stable capacitor operation", "stable capacitance", and "stable dissipation factor" are used to define a capacitor in which no sudden changes of capacitance or dissipation factor occur in the operating temperature range of the capacitor, and especially at higher temperatures. For example a capacitor designed to operate at 125° C. or higher is considered to have stable capacitance if the capacitance is not reduced by more than 10% and/or not increased by more than 20% at the maximum operating temperature from that at 25° C. Similarly, the dissipation factor of a stable capacitor (a stable dissipation factor) at the maximum operating temperature can be lower than that at 25° C., but it does not increase more than about 20% at the maximum operating temperature.

The idea of the present invention stems from the realization that solutions to the to-date-remaining shortcomings in operational characteristics of a PMC can be achieved through a combination of chemical composition of the constituent polymer dielectric material and judicious choice of the geometry of the PMC.

In particular, the answer to the problem of widening a temperature range of operation of the PMC and achieving the stable operation at temperatures as least as high as 125° C. or higher (for example, 140 degrees) is provided by devising a polymer dielectric material the properties of which ensure that the DF of the capacitor is stable throughout the operating temperature range by selecting a polymer dielectric that has a glass transition temperature $T_g$ that is higher than the maximum operating temperature. It was discovered that if the Tg of a polymer is between 25° C. and the maximum operating temperature, then at the Tg the dissipation factor of most radiation-cured polymers is increased. Furthermore, above the Tg the polymer absorbs moisture which has detrimental effects both on the dissipation factor and electrode corrosion. Accordingly, the problem of increasing the range of operating temperatures across which the dissipation factor remains stable is addressed, by the present invention, by formulating a polymer dielectric material with $T_g$ that is significantly higher than the maximum operating temperature.

In addition to the Tg condition, the dielectric must have the ability to self-heal in the event that a breakdown occurs in the capacitor. A problem of maximizing the self-healing properties of a PMC was solved by devising the chemistry of the polymer dielectric material in which the carbon in the polymer is effectively removed in the form of gases (such as CO, $CO_2$, $CH_4$, and $C_2H_6$, for example). Specifically an effective carbon removal process has been shown possible if the monomer materials used to produce the polymer dielectric have an average hydrogen-to-carbon ratio in excess of 1 and an oxygen-to-carbon ratio in excess of 0.1.

Another condition that needs to be satisfied in order to assure high temperature operation of a PMC is maximization of the corrosion resistance of the aluminum electrodes. Generally, an aluminum electrode (when exposed to high temperature and DC voltage in the presence of humidity) undergoes an electrochemical corrosion that reduces the area of the electrode and increases its resistivity. This problem is addressed, at least in part, by passivating the aluminum layers of the PMC structure inline with their deposition. It was discovered that in addition to conventional electrode passivation by exposure to a plasma, post baking of the mother capacitor material to temperatures, in the range of 200° C. to 280° C., also resulted in electrode passivation. The latter form of passivation is possible by creating organometallic bonds between the aluminum electrodes and polymer dielectric. Acrylate polymers formed by radiation curing contain certain percent of uncured monomer in the polymer lattice as well a small percent of acrylic acid and monomer that has undergone random scission. It was discovered that at high temperatures such functional monomer groups react with the aluminum electrodes, thereby preventing access of the aluminum by moisture.

Yet another condition that needs to be satisfied for high temperature operation is reduction of the heating losses in the capacitor. Current metallized film capacitors used in inverter applications can fail when high temperature operation is combined with high ripple current, causing heating due dissipation of power in the resistance of the electrodes. A problem of minimization of the power loss in the PMC is solved by judiciously structuring the capacitor such that a termination edge thereof is defined at the long edge surface of the PMC. In doing so, the mechanical strength of the termination edge of the PMC structured according to an embodiment of the invention is additionally increased by shaping the area of termination of the electrode layers as a heavy edge with the use of a appropriate metallic coating bonded at least to the electrode layers at the terminating surface(s) of the PMC.

Self-Healing.

According to one embodiment of the invention, the specific chemistries of monomer materials used to produce the polymer dielectric layer(s) are chosen to facilitate the capacitor self healing process. In implementing the idea of the invention, PMCs were produced using a wide range of radiation-curable materials that included monomers incorporating carbon-to-carbon double bonds that brake with radiation, to cause the polymer dielectric to cross-link. In one example, such chemistries included acrylate monomers that are cured using electron beam and UV radiation. By choosing an acrylate chemistry that has high H:C and O:C atomic ratios, the self-healing properties were improved by aiding the formation of $Al_2O_3$, $CO$, $CO_2$, $CH_3$, $C_2H_6$ and other hydrocarbon gases that remove Al and C from the site of a breakdown of the carbon-to-carbon double bonds. The elimination of Al and C from the surface of the polymer layer as the electrodes melt back (or fuse), leads to a rapid, quick fusing action, during which a relatively small amount of current was dumped into the failure site. Such process minimizes the damage caused by the electrical short between the electrodes, thereby allowing the voltage across the capacitor electrodes to recover with minimum or no leakage current flow through the damaged dielectric layer. Indeed, in the alternative—when the surface of the polymer continues to hold a high level of carbon thereon (that is, remains "carbonized")—the fusing action will be slowed down, which leads to a greater amount energy to be disposed at the failure site in a unit of time, causing additional breakdowns of adjacent dielectric layers. If not interrupted, this process can lead to a thermal runaway failure of the capacitor. While in most cases the capacitor does not necessarily fail as a result of such failure, it nevertheless loses a significant amount of capacitance. Furthermore, if carbon is not removed adequately from the polymer surface it causes excessive leakage current that compromises the capacitor performance.

Figure 1B:
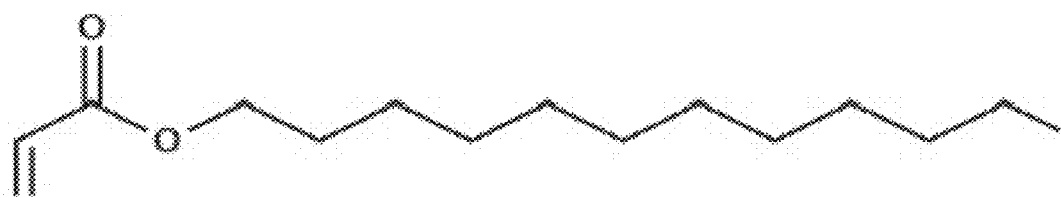

In order to compare the self-healing properties of the PMCs made with polymers having different chemical compositions, a test was performed to determine at least a leakage current through the capacitor after a large number of self-healing events. Initially, a mother capacitor material (with an area of 10 square feet) containing 2000 active capacitor layers was produced with different polymer dielectric materials, but keeping the same dielectric thickness (0.65 micrometer) and electrode resistivity (25 Ohms/square). Individual chips (each with an area of 500 $mm^2$) were segmented from the mother capacitor material and processed into capacitors. Depending on the dielectric constant, the capacitors had a capacitance in the range of 30-35 $\mu F$. At least 50-80 capacitors from every batch were exposed to a DC voltage of 300 V or greater. Exposure of such thin polymer dielectrics to voltages equal to or exceeding 300 VDC caused clearings of weak spots or defects in the capacitor's dielectric material, After exposure to the DC voltage, various capacitor parameters were measured, including capacitance, dissipation factor, equivalent series resistance (ESR), and leakage current. Capacitors with polymer dielectrics that have acceptable self-healing properties had a leakage current of less than 1 $\mu A$. Capacitors with a polymer dielectric that has non acceptable self-healing properties, had a leakage current exceeding 50 $\mu A$. It was empirically determined that the chemistry of the radiation-curable monomers had a significant impact on leakage current generated by the self-healing events and, ultimately, on the maximum voltage that could be applied to the capacitor before the catastrophic failure occurred, For example, a capacitor with a polymer dielectric comprising 2-phenyl-phenyl acrylate (the chain for which is shown schematically in FIG. 1A) demonstrated poor self-healing properties, in stark contradistinction with a capacitor structured with the use of monomer comprising a dodecane acrylate polymer dielectric material, which also has twelve carbons in a aliphatic chain(see FIG. 1B)

The 2-phenyl-phenyl acrylate has a hydrogen-to-carbon ratio of $H:C=0.8$ and an oxygen-to-carbon ratio $O:C$ of 0.13, while the dodecane acrylate is characterized by $H:C=1.86$ and an $O:C=0.14$. In general, we found that, in order for a PMC capacitor designed for a high temperature application to withstand maximum voltage with minimal degradation, it is necessary for the monomer molecules or mixture of monomers used for formation of the polymer dielectric material of such capacitor to have a hydrogen-to-carbon ratio $H:C>1$ and an oxygen-to-carbon ratio $O:C>0.1$ and, preferably, $H:C>1.2$ and $O:C>0.1$. While it was recognized that the presence of other atoms that can lead to formation of gaseous products capable of removing carbon from the polymer surface (such as nitrogen and fluorine, for example) was also beneficial, not many related embodiments of monomers were evaluated to develop a criterion.

Temperature-Related Parameters.

Figure 2:
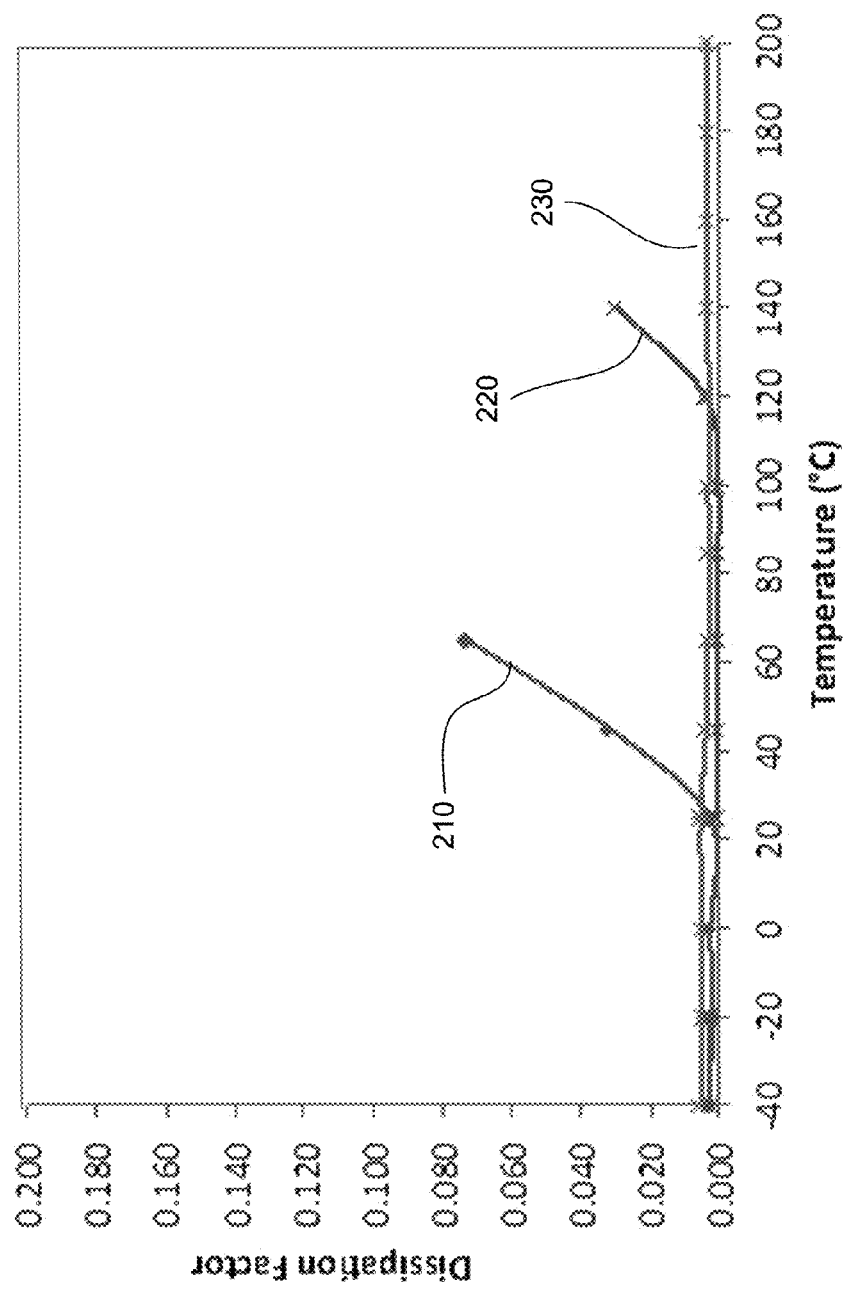
FIG. 2 shows plots representing dependencies of the dissipation factor on temperature for different monolithic polymer capacitors.

In order to address the production of a polymer monolithic capacitor capable of operating reliably at elevated temperatures (up to 125° C. and higher, for example 140 degrees), a behavior of the dielectric loss of the polymer dielectric material was considered. For a stable operation of the PMC it is important that the dissipation factor is stable throughout the desired operating temperature range. The curves 210, 220, and 230 of FIG. 2, show dissipation factors of the three radiation cured polymer dielectrics used to produce the polymer monolithic capacitors according to an embodiment of the invention. These curves demonstrate that the DF of a capacitor can increase at various temperatures based on the chemistry of a particular polymer dielectric material. The DF of a capacitor with a polymer dielectric that includes 4-tert-butylcyclohexyl acrylate, shown by curve 210, increases sharply at about 30° C., while the DF of a capacitor with a polymer dielectric that includes dicyclopentanyl acrylate, shown by curve 220, starts to increase at 120° C. If a capacitor is operated at temperatures where the DF trends upward, the loss will increase the capacitor temperature, which in turn will drive the capacitor to a higher temperature with an even higher DF, which in turn will further increase thermal losses. This process eventually can lead to a thermal runaway failure of the PMC. As a skilled artisan will readily recognize, the data on dissipation factor as a function of temperature for most radiation-cured polymers is either not known or not published. Accordingly, to implement an idea of the present invention, tens of monomers with different monomer formulations were converted into capacitor dielectrics, and measured for DF as a function of temperature up to temperatures of 160° C. and greater. It was unexpectedly determined that for most radiation-cured polymers, the increase in DF coincides with the glass transition temperature (Tg). Unlike the DF, the Tg of many radiation-curable polymers is typically reported by the monomer producers and, therefore, as a result of such empirical determination it was realized that the Tg can be used to select monomers which, when used to form polymer dielectric materials during the process of fabrication of a PMC, can result in a capacitor with a dissipation factors that is substantially the same at elevated temperatures. For example, as shown by curve 230 of FIG. 2, the use of a polymer dielectric material including a mixture of Tricyclodecane Dimethanol Diacrylate and triallyl isocyanurate (both of which have a Tg>200° C.) results in a capacitor with the DF that is stable up to 200° C.

In addition to the DF stability, the value of Tg imposes another limitation on the selection of the polymer dielectric for a PMC. Specifically, it was determined that the use of polymers with lower Tg values leads to absorption of moisture by the capacitor. That is, if the capacitor is operated in ambient conditions of humidity and temperature that is lower than the Tg, the dielectric layers will absorb ambient moisture which, in turn, impacts the stability of capacitance of the PMC. While polymer films such as polypropylene have Tg that is lower than room temperature, they do not absorb water due to the low polarity of the polypropylene chemistry. In comparison, acrylate and other radiation-curable chemistries incorporate higher polarity bonds (such as CO, CN, CF, for example), which may be advantageous because they result in higher polarity chemistry that leads to a higher dielectric constant and, therefore, an increase in energy storage by the resulting PMC. However, the same high polarity chemistry also leads to increase of-moisture absorption. The moisture absorption is minimal until the Tg is reached. Beyond the Tg temperature, the molecular relaxation that occurs at Tg can dramatically increase moisture absorption.

Figure 3:
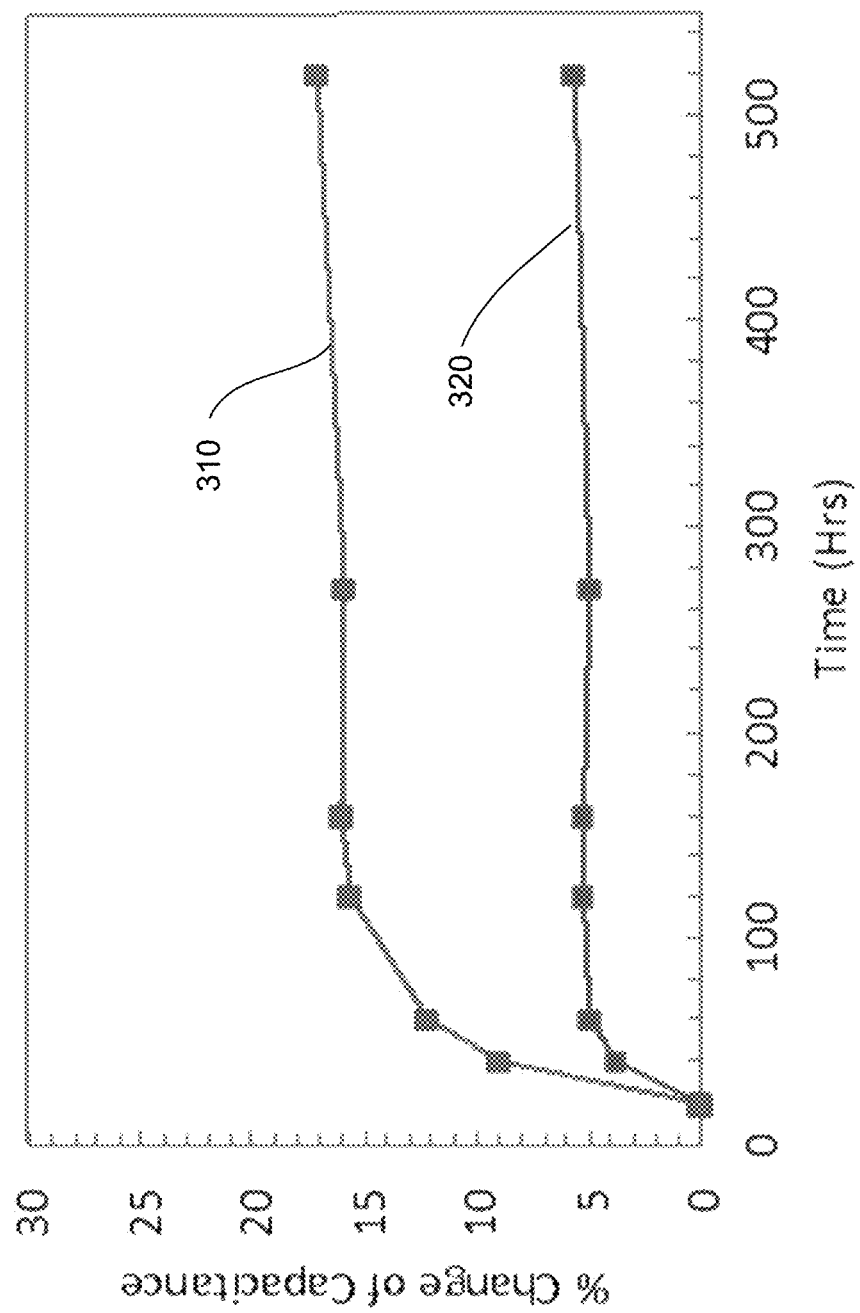
FIG. 3 contains plots representing time-dependent percent change in capacitance of two different monolithic polymer capacitors with time measured in a temperature/humidity test.

The absorption of moisture causes both short-term and long-term reliability issues with the performance of the capacitors performance. Short term the capacitance value increases due to the high dielectric constant of water and longer term the water corrodes the thin capacitor electrodes leading to permanent capacitance loss. This is demonstrated in FIGS. 3 and 4. FIG. 3 depicts plots of percent change in capacitance as a function of time for two types of PMC capacitors. These PMCs have 2000 capacitor layers each but are constructed with two different polymer dielectric materials that have the same dielectric constant k=3.2. Curve 310 of FIG. 3 represents a first polymer dielectric with a $T_{g1}$ of 43° C., while curve 320 represents a second polymer dielectric with a $T_{g2}$ of 100° C. The capacitors were exposed to the ambient environment characterized by 60° C. and 90% relative humidity (RH) for 500 hours without voltage bias, and were intentionally unpackaged to allow the maximum effect of moisture on the capacitor dielectric. Furthermore, small capacitors chips (with areas of about 12 mm²) were used, so that any moisture penetrating into the dielectric layers at the edges of the capacitor would have a more pronounced effect on capacitance. Water has a dielectric constant in the range of k=75 to 80 and, when absorbed by a polymer dielectric with a k of 3.2, it increases the dielectric constant of the polymer dielectric, thereby resulting in an increase of capacitance. As follows from FIG. 3, at a test temperature of 60° C. (which is higher than $T_{g1}$), the value of capacitance of the PMC built with the first polymer dielectric increases significantly and more than that corresponding to the PMC built with the second polymer dielectric.

Figure 4:
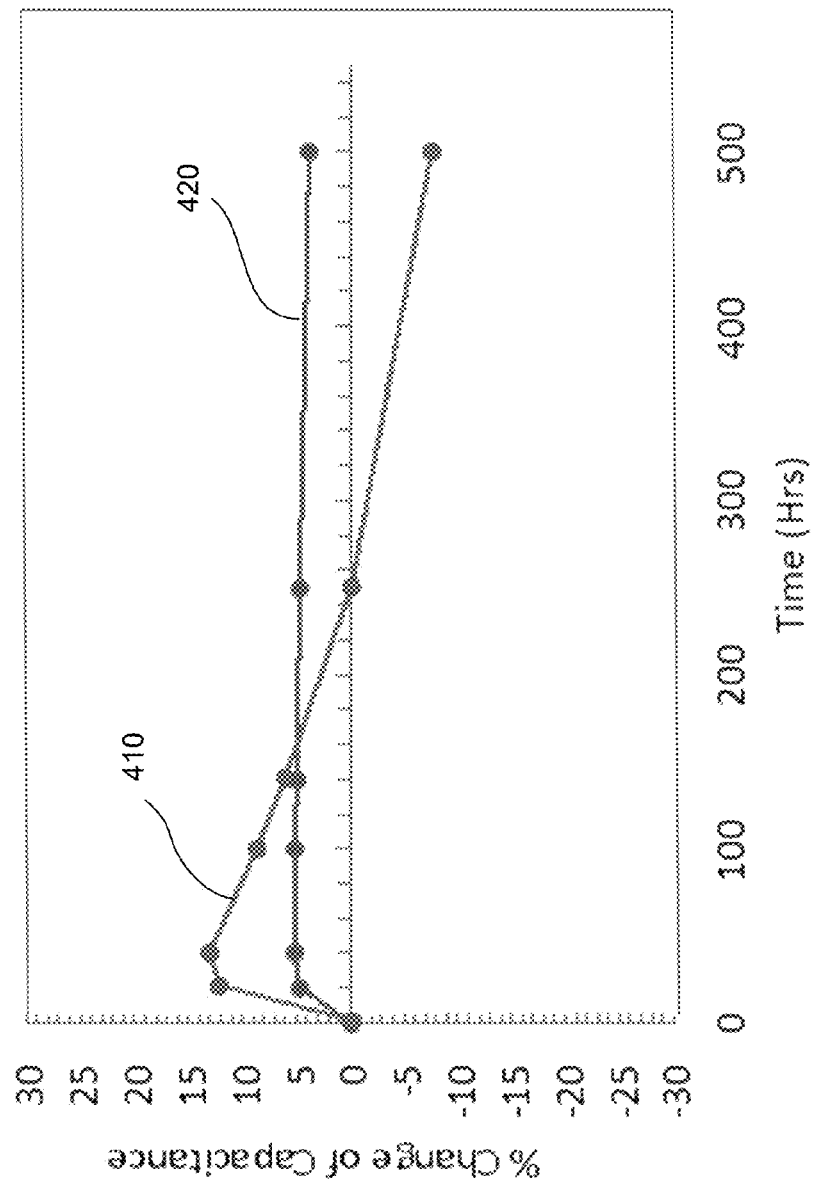
FIG. 4 contains plots representing time-dependent percent change in capacitance of two different monolithic polymer capacitors with time, measured in a temperature/humidity test with DC bias voltage.

As part of the test, capacitors fabricated with the first and second polymer dielectrics were exposed to the same conditions of temperature and humidity but with the addition of DC voltage bias. The illustration of FIG. 4 shows that the first PMC capacitor (employing the dielectric with the lower $T_{g1}$, represented by curve 410) after a relatively short period of time following the beginning of the exposure started to loose capacitance, while the capacitance of the second PMC (utilizing the second polymer dielectric with higher $T_{g2}$, curve 420) remained comparably unchanged. The application of DC voltage triggers a corrosion mechanism in the aluminum metallized capacitor electrodes which reduces the electrode surface area. Therefore, in order to devise a PMC that would perform reliably (in contradistinction with a conventional capacitor that employs a dielectric material such as polypropylene) at extreme temperatures, a radiation-cured dielectric material used to produce a PMC according to an embodiment of the invention should have both a DF that is substantially unchanged across the range of operating temperatures as well as a Tg value that is equal or greater that the desired operating temperature.

Very few radiation-curable monomers were found to result in polymers that combine both low DF and Tg that was higher than 125° C. (which is a target temperature for DC-link capacitors for automotive applications). Most such high Tg monomers have either cycloaliphatic chemistry or they have more than two double bonds. Trifunctional monomers such as tris(2-hydroxy ethyl)isocyanurate triacrylate and triallyl isocyanurate (the behavior of which is represented by curve 230 of FIG. 2) have Tg>125° C. and DF<0.01 that is substantially unchanged up to this temperature. Cycloaliphatic monomers, which include an adamantane (adamantyl) structure resembling that of diamond (such as 2-methyl-2-adamantyl acrylate, 1,3-adamantanediol diacrylate, and tricyclodecane dimethanol diacrylate, for example) also have Tg>125° C. Various formulations of polymers designed to maximize the dielectric constant, self-healing properties, and lower DF can include certain materials that have Tg<125° C. as long as the Tg of the formulated polymer dielectric is greater than 125° C. and preferably greater than 140° C., given that a PMC operating at 125° C. can reach temperatures of 140° C. or even higher due to the presence of high ripple currents and related thermal losses.

At the same time it was discovered that certain monomers that result in highly cross-linked polymer dielectrics (at least two acrylate groups), such as for example hexane diol diacrylate with Tg=41° C., trimetyl propane triacrylate with Tg=62° C., and dimethyl propane tetraacrylate with Tg=96° C., also have a stable DF at temperatures exceeding 125° C. due to the molecular weight and crosslinking nature of the monomer. When producing PMC capacitors with such polymer materials we found that when such capacitors were life tested at 125° C. with the application of DC voltage, there was high moisture absorption which rapidly degraded the capacitor properties. Therefore, the measurement of the temperature-dependent behavior of the DF alone is not adequate to determine if a polymer has a Tg that will make it usable for this invention. To determine the Tg of a polymer dielectric material, 2000 layers of polymer only stacks were produced using the same radiation curing conditions as those used to produce a PMC. The complex modulus of the polymer dielectric was then measured as a function of temperature using a Dynamic Mechanical Analysis (DMA) methodology to determine the Tg. Therefore, the process of selecting a monomer formulation that leads to a high performance high temperature polymer dielectric is elaborate and not obvious to someone skilled in the art.

Capacitor Geometry.

According to the teachings of the present disclosure, the geometry of a polymer monolithic capacitor is devised such as to reliably service a switching application that combines high ripple currents and high ambient temperatures. The related art teaches that in order to increase the capacitor energy density of polymer monolithic capacitors it is important to have capacitor electrodes with resistivity corresponding to the sheet resistance values in the range of 10 Ohms/square to 500 Ohms/square). The equivalent series resistance (ESR) of the capacitor, which depends on the sheet resistance, contributes to capacitor losses. While lower values of the ESR can be easily attained by increasing the conductivity of the electrodes (which can be done by increasing electrode thickness, for example), the thicker electrodes result in poor self-healing properties. The approach chosen for the purposes of the present disclosure is rooted, at least in part, in a judicious choice of the capacitor's geometry and is devoid of an overall increase of the thickness of the electrodes across the capacitor.

We discovered that in applications that involve AC current (such as high-frequency ripple current in a switching circuit), high resistivity increases the capacitor equivalent series resistance (ESR), which leads to losses of power via $I^2R$ (where R denotes the ESR and I denotes the AC current). The resulting from the power losses increased heating of the capacitor, which by itself or in combination with high ambient temperatures, can lead to the capacitor failure. We determined that to minimize the thermal effects of the current while also maintaining the electrodes with higher levels of sheet resistance, which aids the self-healing process, the geometry of the capacitor has to be chosen to reduce the capacitor's ESR as much as it is practical. This goal can be achieved by shaping the capacitor's body to be elongated, extended on one direction to a greater degree than in another, transverse direction, and establishing the termination structure at the long side of so-shaped capacitor. The higher the target value of the sheet resistance of the electrodes, the higher the ratio of the extent of the termination edge to that of the other edge has to be. For example, a 2000 layer capacitor shaped as a square (when viewed perpendicularly to the capacitor's layers) and that has electrodes with the sheet resistance of 50 Ohms/square has an ESR at a resonance frequency of approximately 25 mohm. If the capacitor is five times as long along the termination side as it is wide, however, the ESR value drops to approximately five times to 5 mohm and so do the heating losses.

Figure 5A:
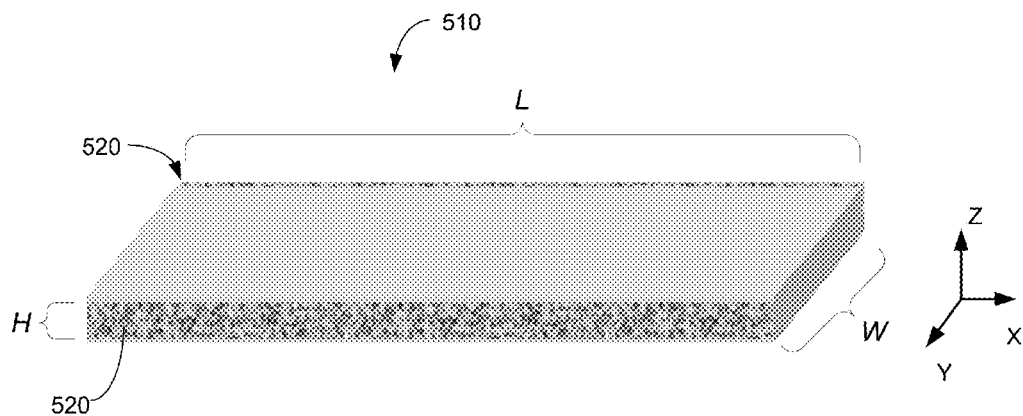
FIGS. 5A, 5B, 5C, 5D provide schematic diagrams illustrating embodiments of polymer capacitors.
Figure 5B:
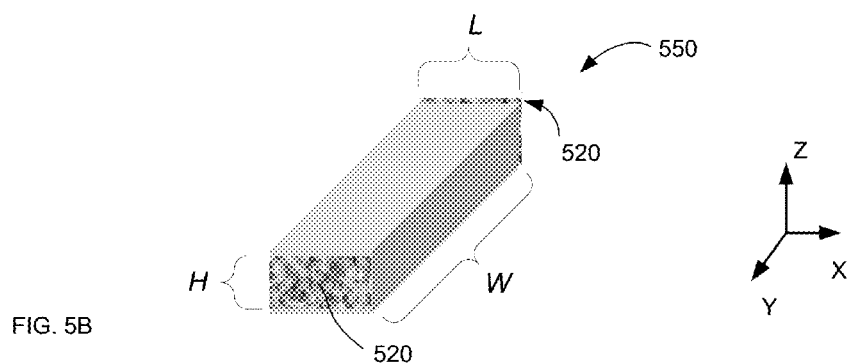
Figure 5D:
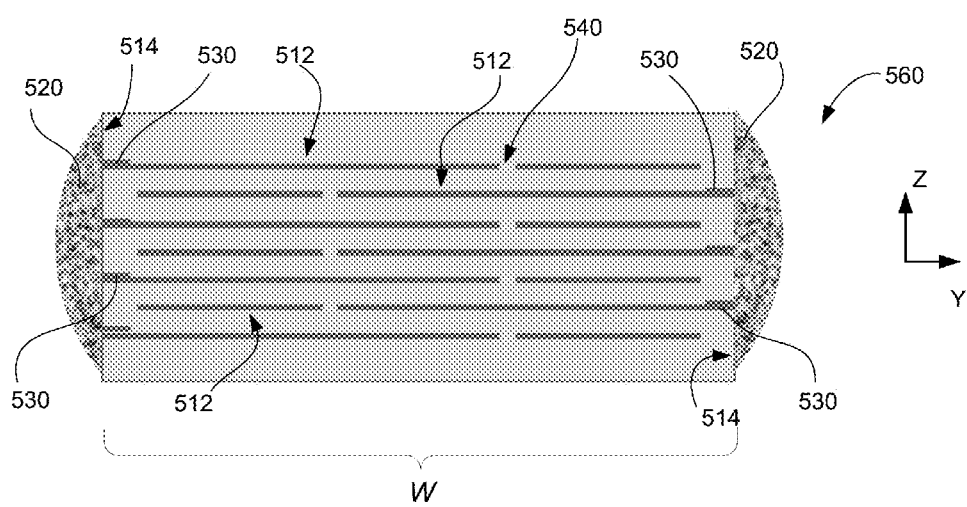
Figure 5C:
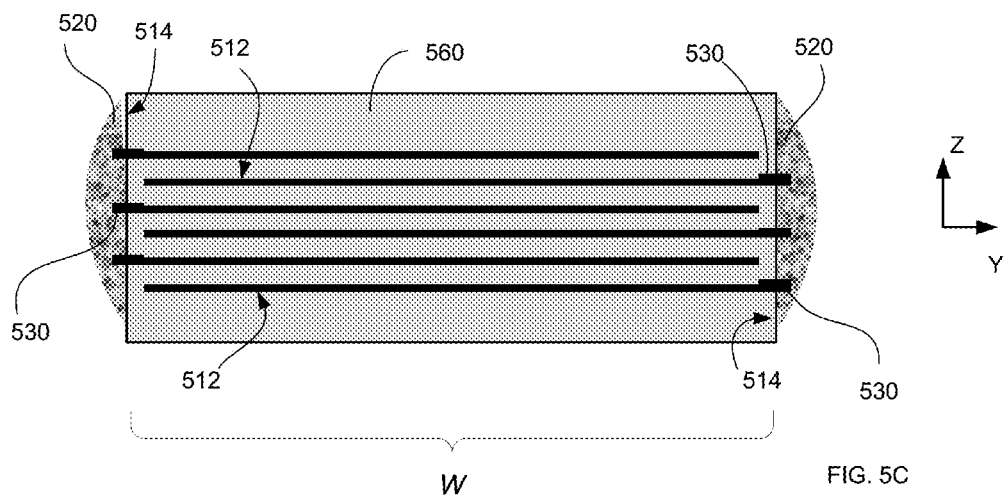

FIGS. 5A, 5B, and 5C provide corresponding illustrations, of which FIGS. 5A, 5B show examples of two PMCs 510, 550 and FIG. 5C illustrates a not-to-scale cross-section of any of the capacitors 510, 550. Each of the capacitors 510, 550 includes thousands of capacitor layers 512 shown in FIG. 5C. Multiple layers 512 are connected at the termination facets 514 of the structures by termination coating 520, such as electric arc spray, which shorts the electrode layers together and establishes a contact point to charge and discharge the capacitor. In order to improve the mechanical strength and reduce the contact resistance of the structure of a PMC, the electrodes 512 are configured to have heavy edges 530, outside the active capacitor area and in proximity to the termination coating 520, so that the thicker edge-portion of an individual electrode layer does not affect the capacitor self-healing properties. It was discovered that in order to maximize the capacitor self-healing process (which requires the use of electrodes with higher sheet resistance values while also minimizing the impact of the higher sheet resistance on the ESR), the general geometry and the ratio L/W of the PMC devised according to an embodiment of the invention should follow that of capacitor 510 where L/W≥1 and preferably L/W>2.

In one implementation, such geometry is achieved, simultaneously with increasing the capacitor voltage and without resorting to capacitor shapes that are not practical, by connecting electrodes in series internally to the PMC structure. This is illustrated schematically in the example of FIG. 5D, in which the embodiment of the capacitor of the invention is shown to contain three internal sections of electrodes in series 540, which effectively increases the L/W ratio of each of the three sub-capacitor structures by a factor of three as compared to the case shown in FIG. 5C (the structure of which is devoid of such serial connections. It should also be noted that in order to protect the PMC from damage during handling, additional protective dielectric layers 560 are deposited on both sides of the mother capacitor material.

In order to practice the invention and produce a PMC that can reliably function at temperatures as high as at least 125° C., the capacitor electrodes must be passivated. A mechanism leading to potential failure of all metallized film capacitors includes excessive capacitance loss during the lifetime of the capacitor in an environment with high temperature and high humidity. Typically, in most applications, if the loss of capacitance exceeds about 5 to 10%, the capacitor is considered to have failed.

Two different methods for minimizing such corrosion mechanism have been devised according to embodiments of the invention. One such method stems from discovery that when PMC is heated above a certain temperature (and, specifically, temperatures in the range of 200° C. to 280° C.) organometallic bonds are formed between the surface of the metal electrodes and the polymer dielectrics, resulting in blocking access of water to the metal of the electrodes. Because the metal electrode is formed in the vacuum in the absence of an oxidizing gas, the highly reactive surface of an electrode (made of aluminum, zinc or other metal) can be forced to react with the polymer or residual monomer in the already-formed polymer dielectric material of the PMC. The organometallic bonds on the electrode surface block molecules of water from reaching the surface and thus increase the corrosion resistance of the electrodes. For example, a PMC capacitor produced using two thousand layers of hexane diol diacrylate radiation-cured monomer, when placed in an accelerated corrosion test chamber at 125° C. and 30 psi of steam for one hour, exhibits full corrosion of the electrodes, as a result of which most of the originally metal-electrode surface turns into the transparent aluminum oxide.

Advantageously, when the electrodes of the PMC fabricated according to an embodiment of the invention were baked in the same chamber at 260° C. for six hours, the capacitor electrodes exhibited no apparent degradation. For capacitors employing different dielectric materials, the required passivation temperature may vary with polymer chemistry and time of exposure of the capacitor to the elevated temperature. It was empirically shown that for most radiation-cured polymer dielectric materials that can be used in an embodiment of the invention, passivation at 160° C. requires at least a six-to-seven day bake, while passivation at 200° C. reduces the duration of this process to 24 hours, and passivation at 240° C. requires only a 12 hour bake to achieve the desired results.

According to another implementation of the invention, the capacitor electrodes are passivated by exposing them to a oxidative plasma during the deposition process. The plasma may contain oxygen or other gases than react with the electrode surface. When a metal electrode (such as an aluminum electrode, for example) deposited in the vacuum chamber is exposed to an oxygen-containing gas in the chamber, a high-quality $A_2O_3$ oxide is formed on its surface, which is superior to the hydrated oxide ($Al_2O_3.(H2O)$), that is formed upon exposure of the metal surface to air (containing both oxygen and moisture). In related embodiments, different plasma gases have been successfully used for this process including $O_2$, Ar, $CO_2$, $N_2$ and $N_2O$ and mixtures thereof.

Yet another method for enhancing the electrode passivation was discovered by exposing the polymer dielectric layer of the capacitor, prior to the deposition of the electrode layer thereon, to a plasma containing an oxidizing gas. The oxidizing gas was shown to create functional groups on the surface of the polymer (such as carboxyl and hydroxyl groups, for example) that react with the metal of the electrode layer and aid the passivation process.

Figure 6A:
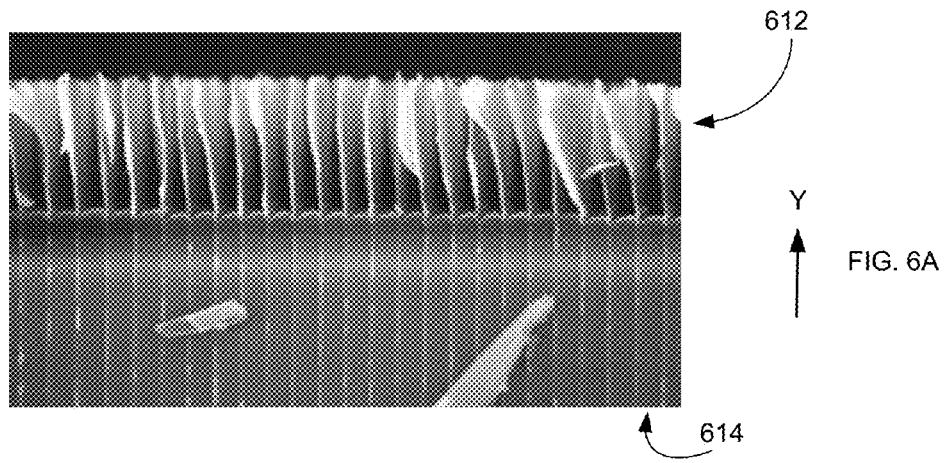
FIGS. 6A, 6B, 6C show images obtained with the use of SEM and illustrating the electrical termination edge of polymer monolithic capacitors prior to the application of the termination coating.

Notably, one of the questions accompanying the fabrication of a reliable PMC is how to establish a reliable and mechanically strong electrical contact with the individual electrode layers of the PMC structure (such as the electrodes 512 of the embodiments of FIGS. 5C and 5D), in which thin capacitor electrodes 512 are intentionally equipped with "heavy edges" 530 that are shorted together by the layer 520. In order to effectively short the heavy edges 530 together, the polymer at the capacitor edge is removed by plasma-ashing as shown in the SEM-derived view of a terminating edge surface in FIG. 6A. The length of the exposed portions 612 of the individual electrodes varies with the capacitor design and thickness of the dielectric material 614 between the electrodes. After exposing portions 612 of the electrodes, connecting the electrodes together can be effectuated, for example, by arc-spraying the exposed portions 612 with one of more layers of metal (such as aluminum, zinc, brass, solder or a combinations thereof, to name just a few) depending on the particular application and the manner in which leads are attached to the sprayed termination. The resulting termination is adequate for most applications, but for surface-mount applications the arc-sprayed termination may be additionally coated with a conductive epoxy and then arc-sprayed again and plated with a solderable coating. The conductive epoxy acts as a thermomechanical shock absorber to facilitate thermal expansion and contraction of the structure on a printed circuit board without damaging the capacitor termination.

Figure 6B:
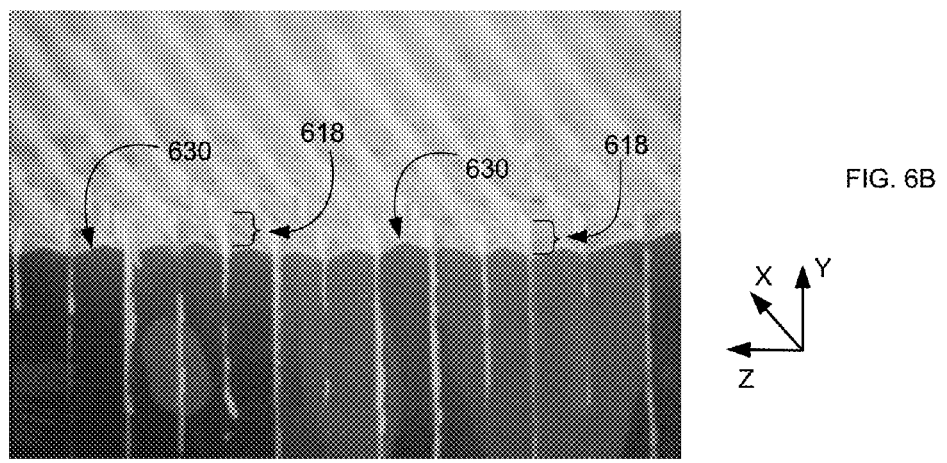
Figure 6C:
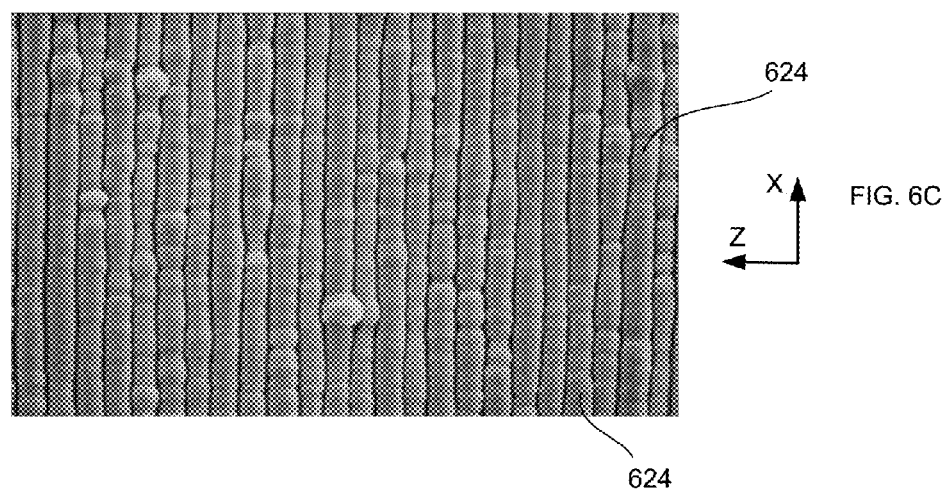

In a related embodiment, an alternative termination method has been developed, according to which plasma-ashing was performed to expose a controlled length 618 of a heavy edge 530 as shown in the SEM-captured cross-section in FIG. 6B. The so-exposed portions 618 of the electrodes were then coated with a multilayer sputtering coating 624 shown in FIG. 6C. The multilayer sputtered coating 624 acts to bond itself to the exposed portions 618 of the (aluminum) electrodes and the exposed surface 630 of the polymer dielectric material separating the portions 618, as well as to the material used at the following processing step. This step varies depending on the application, and may include soldering of the sputtered electrodes (when the sputtered coating includes copper, for example), or coating the sputtered electrodes with a conductive epoxy, which is arc-sprayed and then metal-plated.

Additional processing steps may be optionally performed in producing the capacitors according to an embodiment of the invention. Some of these processes have been referenced by the related art (see, for example, U.S. Pat. Nos. 5,018, 048; 5,716,532; and 6,092,269, the disclosure of each of which is incorporated herein by reference), including creating demetallization zones (such as the ones used for the internal series connections using shadow masking or oil-vapor masking; cutting the mother capacitor material; etching the exposed edge of the individual capacitor to prevent flashover at higher voltages; including protective layers (that may include metallized and polymer only layers for example) on the bottom and top of the capacitor stack, lead attach, and packaging of the resulting structure, to name just a few.

The present application addresses a PMC containing a polymer dielectric material that possesses self-healing properties superior to those of a conventional PMC. The embodiments of the present invention are configured to operate at temperatures of 125° C. and higher while maintaining a stable dissipation factor across the range of operating temperatures, and possess corrosion-resistant electrodes. The polymer dielectric material of these polymer monolithic capacitors is characterized by a glass transition temperature that is higher than the chosen operating temperature, contributing to a stable dissipation factor and reduced moisture absorption. Such choice of a glass-transition temperature, combined with a prismatic capacitor shape (that has a specific length to width ratio) results in a PMC uniquely qualified to service high temperature switching applications that combine DC voltage with high frequency ripple currents The fabrication of a single PMC with the use of the solutions outlined above yields a capacitor having superior performance and durability, in comparison with a metallized polypropylene capacitor of the related art, in particular when used under conditions typical for under-the-hood automotive applications.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, it is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

It will be readily apparent to those skilled in this art that various changes and modifications of an obvious nature may be made, and all such changes and modifications are considered to fall within the scope of the present invention.

The invention claimed is:

1. A polymer monolithic capacitor formed in the vacuum, the capacitor comprising:
    multiple polymer dielectric layers, and
    multiple metallized electrode layers,
        wherein at least one polymer dielectric layer comprises a chemical structure with a hydrogen-to-carbon ratio of at least 1.0 and an oxygen-to-carbon ratio of at least 0.1,
        wherein at least one polymer dielectric layer has a glass transition temperature greater than 100° C., and
        wherein said capacitor has a dissipation factor of less than 0.02 at 140° C.

2. The polymer monolithic capacitor of claim 1, wherein said at least one polymer dielectric layer has a chemical structure with a hydrogen-to-carbon ratio of at least 1.2.

3. The polymer monolithic capacitor of claim 1, wherein said at least one polymer dielectric layer has a glass transition temperature greater than 140° C.

4. The polymer monolithic capacitor of claim 1, wherein a metallized electrode layer has a heavy edge.

5. The polymer monolithic capacitor of claim 1, wherein at least one metallized electrode layer has a passivated surface.

6. The polymer monolithic capacitor of claim 1, characterized by a dissipation factor of less than 0.01 at 140° C.

7. The polymer monolithic capacitor of claim 1, comprising two or more internal electrical connections configured in series.

8. The polymer monolithic capacitor of claim 1, wherein at least one metallized electrode layer is passivated and contains organometallic bonds between an adjacent polymer dielectric layer and a surface of the metallized electrode layer.

9. The polymer monolithic capacitor of claim 1, wherein said capacitor has a prismatic shape with transverse dimensions L, W, and H, wherein L represents a first extent of the capacitor along which the capacitor is equipped with an electrical termination, W represents a second extent of the capacitor, and H represents a third extent of the capacitor in a direction in which said polymer dielectric layers and metallized electrode layers are stacked, and wherein the ratio of said first extent to said second extent is greater than 1.

10. The polymer monolithic capacitor of claim 9, wherein said ratio is greater than 2.

11. The polymer monolithic capacitor of claim 1, wherein each polymer dielectric layer comprises a chemical structure with a hydrogen-to-carbon ratio of at least 1.0 and an oxygen-to-carbon ratio of at least 0.1, and wherein each polymer dielectric layer has a glass transition temperature greater than 100° C.

12. An article of manufacture that includes the polymer monolithic capacitor of claim 1.

13. A polymer monolithic capacitor formed in the vacuum, the capacitor comprising:
    multiple polymer dielectric layers, and
    multiple metal electrode layers
        wherein at least one polymer dielectric layer includes a chemical structure with a hydrogen-to-carbon ratio of at least 1.0 and an oxygen-to-carbon ratio of at least 0.1,
        wherein at least one metal electrode layer has a surface layer that is passivated, and
        wherein said capacitor has a dissipation factor of less than 0.02 at 140° C.

14. The polymer monolithic capacitor according to claim 13, wherein at least one polymer dielectric layer includes a chemical structure with a hydrogen-to-carbon ratio of at least 1.0 and an oxygen-to-carbon ratio of at least 0.1, and wherein each metal electrode layer has a surface layer that is passivated.

15. The polymer monolithic capacitor of claim 13, wherein at least one polymer dielectric layer comprises a chemical structure with a hydrogen-to-carbon ratio of at least 1.2.

16. The polymer monolithic capacitor of claim 13, wherein at least one metal electrode layer has a heavy edge.

17. The polymer monolithic capacitor of claim 13, wherein at least one polymer dielectric layer has a glass transition temperature greater than 125° C.

18. The polymer monolithic capacitor of claim 13, wherein at least one polymer dielectric layer has a glass transition temperature greater than 140° C.

19. The polymer monolithic capacitor of claim 13, which has a dissipation factor of less than 0.01 at 140° C.

20. The polymer monolithic capacitor of claim 13, comprising two or more internal electrical connections configured in series.

21. The polymer monolithic capacitor of claim 13, wherein said capacitor has a prismatic shape with transverse dimensions L, W, and H,
    wherein L represents a first extent of the capacitor along which the capacitor is equipped with an electrical termination, W represents a second extent of the capacitor, and H represents a third extent of the capacitor in a direction in which said polymer dielectric layers and metal electrode layers are stacked, and
    wherein the ratio of said first extent to said second extent is greater than 1.

22. The polymer monolithic capacitor of claim 13, wherein said ratio is greater than 2.

23. An article of manufacture that includes the polymer monolithic capacitor of claim 13.

24. A polymer monolithic capacitor formed in the vacuum, the capacitor comprising:
    multiple polymer dielectric layers, and
    multiple metallized electrode layers
        wherein a polymer dielectric layer comprises a chemical structure with a hydrogen-to-carbon ratio of at least 1.0 and an oxygen-to-carbon ratio of at least 0.1, and
        wherein said capacitor has a dissipation factor smaller than 0.02 at a temperature greater than 100° C.

25. The polymer monolithic capacitor of claim 24, wherein each of said polymer dielectric layers includes a chemical structure with a hydrogen-to-carbon ratio of at least 1.0 and an oxygen-to-carbon ratio of at least 0.1.

26. The polymer monolithic capacitor of claim 24, wherein the dissipation factor is smaller than 0.01 at said temperature.

27. The polymer monolithic capacitor of claim 24, wherein the dissipation factor is smaller than 0.02 at a temperature exceeding 140° C.

28. The polymer monolithic capacitor of claim 24, wherein the dissipation factor is smaller than 0.01 at the temperature exceeding 140° C.

29. The polymer monolithic capacitor of claim 24, wherein a metal electrode layer has a heavy edge.

30. The polymer monolithic capacitor of claim 24, wherein a polymer dielectric layer has a glass transition temperature greater than 100° C.

31. The polymer monolithic capacitor of claim 24, wherein a polymer dielectric layer has a glass transition temperature greater than 140° C.

32. The polymer monolithic capacitor of claim 24, comprising two or more internal electrical connections configured in series.

33. The polymer monolithic capacitor of claim 24, wherein a metallized electrode layer contains a layer of passivated material of said electrode and an organometallic bond.

34. The polymer monolithic capacitor of claim 24, wherein said capacitor has a prismatic shape with transverse dimensions L, W, and H, wherein L represents a first extent of the capacitor along which the capacitor is equipped with an electrical termination, W represents a second extent of the capacitor, and H represents a third extent of the capacitor in a direction in which said polymer dielectric layers and metallized electrode layers are stacked, and wherein the ratio of said first extent to said second extent is greater than 1.

35. An article of manufacture that includes the polymer monolithic capacitor of claim 24.

36. A polymer monolithic capacitor formed in the vacuum, the capacitor comprising:
multiple polymer dielectric layers, and
multiple metallized electrode layers,
wherein at least one polymer dielectric layer comprises a chemical structure with a hydrogen-to-carbon ratio of at least 1.0 and an oxygen-to-carbon ratio of at least 0.1,
wherein at least one polymer dielectric layer has a glass transition temperature greater than 100° C., and
wherein at least one metallized electrode layer is passivated and contains organometallic bonds between an adjacent polymer dielectric layer and a surface of the metallized electrode layer.

37. The polymer monolithic capacitor of claim 36, wherein said at least one polymer dielectric layer has a chemical structure with a hydrogen-to-carbon ratio of at least 1.2.

38. The polymer monolithic capacitor of claim 36, wherein said at least one polymer dielectric layer has a glass transition temperature greater than 140° C.

39. The polymer monolithic capacitor of claim 36, wherein a metallized electrode layer has a heavy edge.

40. The polymer monolithic capacitor of claim 36, vherein at least one metallized electrode layer has a passivated surface.

41. The polymer monolithic capacitor of claim 36, comprising two or more internal electrical connections configured in series.

42. The polymer monolithic capacitor of claim 36, wherein said capacitor has a prismatic shape with transverse dimensions L, W, and H, wherein L represents a first extent of the capacitor along which the capacitor is equipped with an electrical termination, W represents a second extent of the capacitor, and H represents a third extent of the capacitor in a direction in which said polymer dielectric layers and metallized electrode layers are stacked, and wherein the ratio of said first extent to said second extent is greater than 1.

* * * * *